Aug. 12, 1941.    W. L. STEELE    2,252,046
FURNACE
Filed Oct. 17, 1938

William L. Steele
INVENTOR

BY Victor J. Evans & Co.
ATTORNEYS

WITNESS

Patented Aug. 12, 1941

2,252,046

UNITED STATES PATENT OFFICE 2,252,046

FURNACE

William L. Steele, Seattle, Wash.

Application October 17, 1938, Serial No. 235,535

6 Claims. (Cl. 158—1)

My invention relates to the art of burning gaseous fuel for the production of heat for heating homes and the like, and has among its objects and advantages the provision of an improved furnace of the hot air type.

The present application is a continuation in part of my patented application filed June 22, 1937, Serial No. 149,742, now Patent No. 2,144,129, issued January 17, 1939.

Conventional heating furnaces of the hot air type employ a combustion chamber located against the heating surface or shell of the furnace. As a rule, the lower area of the furnace shell is lined with refractory material throughout the combustion chamber area. In constructions of this nature, the combustion chamber, in being placed against the shell proper, practically eliminates the portion covered as heating area. Accordingly, an object of my invention is to provide a furnace so constructed as to greatly increase the heating area in a shell of given size and in which the construction is such as to greatly increase the heat absorption of the furnace.

More specifically, it is a further object of my invention to provide a burner or combustion chamber located inside the furnace proper in spaced relation with the furnace shell, thereby greatly increasing the heating area of the furnace. The combustion chamber is lined with suitable refractory material and is located at the bottom of the furnace proper. It is a well known fact that the bulk of the heat from a luminous flame such as an oil fire is radiant heat. My combustion chamber is so related to the furnace shell that the greater area of the heating surface of the shell is directly exposed to radiant heat from the fire. I arrange the combustion chamber inside the furnace in such manner as to permit down-draft circulation of the hot gases or burnt products of combustion. The flue outlet is located at the bottom of the furnace, and the combustion chamber extends upwardly from the furnace bottom. To the top of the combustion chamber, I attach a baffle so designed that the space between the baffle and the furnace is of the same area as the flue outlet. This compels the down-going hot gases to pass evenly all around the baffle, thereby heating the furnace shell uniformly all the way around. Accordingly, I provide a furnace of the hot air type wherein hot spots or overheated areas are eliminated. The baffle, in combination with the location of the outlet flue, slows down the heat travel through the furnace in such degree as to greatly increase the heat absorption of the furnace. Absence of the baffle or equivalent means would cause the flue outlet to draw a major portion of the hot gases to the side where the flue leaves the furnace body. My invention eliminates such unequal heat distribution.

A further object is to provide a water heating coil arranged in heat transfer relation with the combustion chamber in which novel means are incorporated for controlling the amount of heat transmitted to the coil. The coil is so related to the combustion chamber as to be effectively heated with a relatively small fire. Thus the furnace may be employed for water heating purposes during summer.

Figure 1:
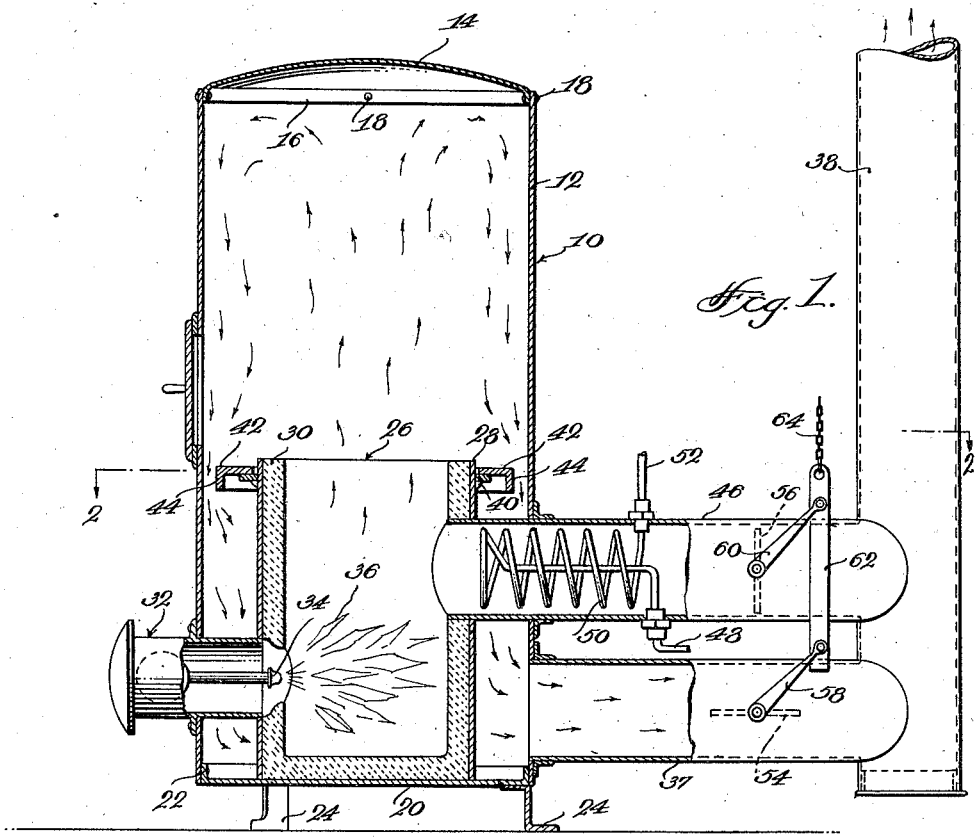
Figure 1 is a vertical sectional view of a furnace embodying my invention.
Figure 2:
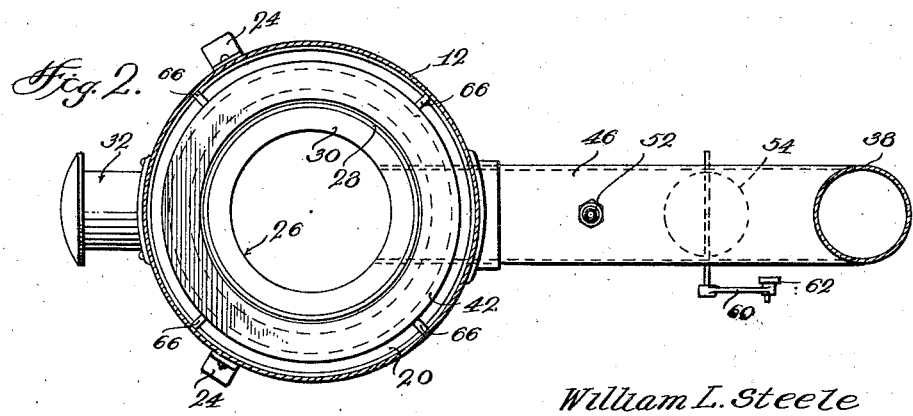
Figure 2 is a sectional view along the line 2—2 of Figure 1.

In the embodiment selected to illustrate my invention, the furnace 10 comprises an upright shell 12 preferably circular in cross section. The top 14 is flanged at 16 and the flange is secured to the shell 12 in the usual manner, as by rivets 18. The lower end of the shell 12 is provided with a bottom 20 flanged and riveted at 22 to the shell. Legs 24 support the furnace proper in an upright position.

Inside the shell of the furnace, I mount a burner or combustion chamber 26 in the nature of a fire pot, which comprises a circular metallic shell 28 preferably arranged concentrically with the shell 12. I provide the shell 28 with a lining 30 of refractory material such as is commonly used in furnace structures. The bottom 20 extending across the combustion chamber is also provided with refractory material. An oil burner unit 32 provided with a conventional nozzle 34 extends through the shells 12 and 28 for delivering the fuel spray 36 into the combustion chamber 26. A flue outlet 37 communicates with the shell 12 near the bottom 20. Flue outlet 37 delivers the burnt products of combustion to the flue 38 for escape to the atmosphere.

The wall structure of the combustion chamber 26 is spaced from the shell 12 so as to utilize the otherwise covered furnace area for additional heat absorption surface in the furnace proper. Combustion chamber 26 is open at its top and is located at the bottom of the furnace so that the larger part of the heating surface is directly exposed to the radiant heat from the fire. The hot gases move upwardly and then sweep downwardly of the shell 12 to exit by way of the flue outlet 37. Shell 28 is provided with lugs 40 which support a baffle ring 42 having a down-turned flange 44 arranged in spaced and concentrical relation with the shell 12. Ring 42 is preferably located at a point about even with the top of the combustion chamber, and the space between the down-turned flange 44 and the shell 12 is of the same area as the cross sectional area of the flue outlet 37. Thus the area of the space between the ring and the shell 12 compels the down-going hot gases to pass evenly all around the baffle, thereby heating the surface area equally all the way around. Thus my furnace structure is devoid of the hot spots or overheated areas that occur in other furnaces of the hot air type. The down-draft feature slows down the travel of the products of combustion, thus allowing more time for heat absorption. The close proximity of the baffle to the furnace wall compels equal heat distribution over the entire furnace.

The construction is exceedingly simple, while the arrangement of the parts is such as to provide a highly efficient furnace. The simplicity of the design makes the furnace very economical to build.

Means are provided for heating domestic water. In Fig. 1, I illustrate a flue outlet 46 as having communication with the combustion chamber 26 and venting into the flue 38. The cold water line 48 passes through the flue 46 and is connected with a coil 50, the other end of which is connected with the hot water outlet pipe 52. Flue outlet 37 is provided with a rotary damper 54, while flue outlet 46 is provided with a similarly mounted damper 56. Damper 54 is connected with an arm 58, while damper 56 is connected with an arm 60. Both arms are pivotally connected with a bar 62 which may be connected with a pull chain 64 permitting adjustment of the dampers from a remote position. Thus the dampers 54 and 56 are connected for simultaneous movement, but the operating linkage is so devised as to fully open the damper 54 as the damper 56 is fully closed.

During winter months when the furnace is employed for house heating purposes, the damper 56 is maintained closed since the heavier fire employed during such months is sufficiently hot to heat the coil 50 to such a degree as to maintain a sufficient supply of hot water. At times the hot water demand may be exceptionally heavy so as to necessitate slight opening of the valve 56. In any event, the total flue outlet area remains the same even though both the dampers are partly open. It will thus be seen that the coil 50 may be additionally heated while at the same time maintaining a balanced flue outlet area with respect to the passage area between the flange 44 and the shell 12.

Without further elaboration, the foregoing will so fully illustrate my invention that others may, by applying current knowledge, readily adapt the same for use under various conditions of service.

I claim:

1. A furnace comprising a shell, a combustion chamber open at its upper end located at the bottom of the shell and spaced from its side walls, to provide a down-draft passage for burnt products of combustion, means for delivering fuel to the combustion chamber, said shell having an outlet flue near its bottom of a cross sectional area substantially equal to the cross sectional area of the down-draft passage, a second outlet flue of the same cross sectional area as said first outlet flue leading into the combustion chamber only, a water heating coil in said second outlet flue, damper means in each of the outlet flues, and operating means interconnecting the damper means, one of the damper means being totally closed when the other damper means is totally open, said operating means being so constructed and arranged as to open one damper means while closing the other damper means in the same degree.

2. A furnace comprising a shell, a combustion chamber open at its upper end located at the bottom of the shell in spaced relation with the latter, to provide a down-draft passage for burnt products of combustion, means for delivering fuel to the combustion chamber, a baffle extending laterally of the combustion chamber in spaced relation with said shell, to provide a restricted down-draft passage, said shell having an outlet flue near its bottom of a cross sectional area equal to the cross sectional area of the restricted down-draft passage, a second outlet flue of the same cross sectional area as said first outlet flue leading into the combustion chamber only, a water heating coil in said second outlet flue, damper means in each of the outlet flues, and operating means interconnecting the damper means, one of the damper means being totally closed when the other damper means is totally open, said operating means being so constructed and arranged as to open one damper means while closing the other damper means in the same degree.

3. A furnace comprising a radiant heat absorbing shell, a rafractory lined combustion chamber open at its upper end located at the bottom of the shell and spaced from its sides, to provide a down-draft passage for burnt products of combustion, means for delivering fuel to the combustion chamber, said shell having an outlet flue near its bottom of a cross sectional area substantially equal to the cross sectional area of the down-draft passage, a second outlet flue of the same cross sectional area as said first outlet flue leading into the combustion chamber only, a water heating coil in said second outlet flue, damper means in each of the outlet flues, and operating means interconnecting the damper means, one of the damper means being totally closed when the other damper means is totally open, said operating means being so constructed and arranged as to open one damper means while closing the other damper means in the same degree.

4. A furnace for fluid fuel, comprising: an enclosing shell; an open-top fire pot located inside the shell at its bottom and spaced from the side walls thereof to provide a smoke passage extending about the vertical walls of the fire pot; said fire pot terminating well below the top wall of the shell, to afford its only communication with the interior of the shell; a flue communicating with said passage below the top of the fire pot; and means coacting with the side walls of said shell to define an unobstructed smoke passage between the top margin of the fire pot and the side walls of said shell, entirely surrounding the fire pot at the top margin, and of an effective area substantially equal to the cross-sectional area of said flue.

5. A furnace for fluid fuel; comprising: an enclosing shell having an annular side wall; an open-top fire pot located inside the shell at its bottom and having an annular vertical wall spaced from the side wall of the shell to provide an annular smoke passage between the fire pot and the shell; said fire pot terminating well below the top wall of the shell, to afford its only communication with the interior of the shell; a flue communicating with said smoke passage below the top of the fire pot; and a flange disposed between the fire pot and said shell above said flue to provide an unobstructed annular smoke passage of an effective area substantially equal to the cross-sectional area of said flue and of equal effective down-draft throughout, to uniformly distribute burnt products of combustion throughout said first-mentioned smoke passage.

6. A furnace for fluid fuel, comprising: an enclosing shell; an open-top fire pot located inside the shell at its bottom and spaced from the side walls thereof to provide a smoke passage extending about the vertical side walls of the fire pot; said fire pot terminating well below the top wall of the shell, to afford its only communication with the interior of the shell; a flue communicating with said passage below the top of the fire pot; and the upper margin of said fire pot above said flue being so constructed and arranged and coacting with the side walls of the shell as to define an unobstructed smoke passage between the top margin of the fire pot and the side walls of said shell, entirely surrounding the fire pot at its top margin, and of an effective area substantially equal to the cross-sectional area of said flue.

WILLIAM L. STEELE.